United States Patent
Pham

(10) Patent No.: US 9,972,086 B2
(45) Date of Patent: May 15, 2018

(54) METHOD OF DETERMINING IMAGE QUALITY IN DIGITAL PATHOLOGY SYSTEM

(71) Applicant: Infinitt Healthcare Co., Ltd., Seoul (KR)

(72) Inventor: Duy Hien Pham, Seoul (KR)

(*) Notice: Subject to any disclaimer, the term of this patent is extended or adjusted under 35 U.S.C. 154(b) by 122 days.

(21) Appl. No.: 15/217,083

(22) Filed: Jul. 22, 2016

(65) Prior Publication Data
US 2018/0012352 A1    Jan. 11, 2018

(30) Foreign Application Priority Data
Jul. 11, 2016    (KR) ........................ 10-2016-0087664

(51) Int. Cl.
| | | |
|---|---|---|
| *G06K 9/00* | (2006.01) | |
| *G06T 7/00* | (2017.01) | |
| *G06K 9/46* | (2006.01) | |
| *G06K 9/52* | (2006.01) | |

(52) U.S. Cl.
CPC .......... *G06T 7/0012* (2013.01); *G06K 9/4604* (2013.01); *G06K 9/4642* (2013.01); *G06K 9/4661* (2013.01); *G06K 9/52* (2013.01); *G06T 7/0085* (2013.01); *G06T 2207/20144* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 2005/0136549 A1* | 6/2005 | Gholap | ................ | G06K 9/0014 436/501 |
| 2012/0275671 A1* | 11/2012 | Eichhorn | ............. | G06T 7/0004 382/128 |
| 2014/0009597 A1* | 1/2014 | Abe | ................... | G06K 9/00147 348/80 |
| 2015/0055844 A1* | 2/2015 | Molin | .................. | G06T 7/0012 382/131 |
| 2016/0042122 A1* | 2/2016 | Sato | .................... | G06F 3/04815 715/781 |

FOREIGN PATENT DOCUMENTS

KR    10-1559798    10/2015

OTHER PUBLICATIONS

English translation of 10-1559798.

* cited by examiner

*Primary Examiner* — Shervin Nakhjavan
(74) *Attorney, Agent, or Firm* — Antonio Ha & U.S. Patent, LLC

(57) ABSTRACT

Disclosed is an image quality evaluation method for a digital pathology system according to the present invention. The image quality evaluation method includes receiving a digital slide image by an image quality evaluation unit; dividing the digital slide image into a plurality of blocks by the image quality evaluation unit; analyzing the plurality of blocks to extract a foreground; calculating a blur for the extracted foreground; calculating brightness distortion for the extracted foreground; calculating contrast distortion for the extracted foreground; and evaluating the overall quality of the digital slide image using the blur, the brightness distortion, and the contrast distortion by the image quality evaluation unit.

5 Claims, 2 Drawing Sheets

METHOD OF DETERMINING IMAGE QUALITY IN DIGITAL PATHOLOGY SYSTEM

CROSS-REFERENCE TO RELATED APPLICATION

This application claims priority to and the benefit of Korean Patent Application No. 2016-0087664, filed on Jul. 11, 2016, the disclosure of which is incorporated herein by reference in its entirety.

BACKGROUND

1. Field

The present invention relates to a method of evaluating image quality in a digital pathology system, and more particularly, to an image quality evaluation method for a digital pathology system which can solve a problem in which image quality may be affected during digital slide image processing steps such as a staining process or an image acquisition process in the digital pathology system, for example, a problem in which an image may be slightly blurred or have excessively high brightness or low contrast and also which can evaluate quality of a large image handled by a digital pathology system according to the present invention.

2. Discussion of Related Art

Pathology is a basic medical science for studying a state of a disease or a change in a tissue structure, an organic form, or an organic function of a pathogen in order to find a cause of the disease.

In particular, digital pathology is an image-based information environment which is enabled by computer technology that allows for the management of information generated from a digital slide. Digital pathology is enabled in part by virtual microscopy, which is the practice of producing an image with a microscope and delivering the produced image to a computer network.

Digital pathology is globally recognized as an emerging field of diagnostic medicine. This is because, compared to a well-known and existing method, digital pathology may achieve even better, faster and cheaper diagnosis, prognosis and prediction of cancer which is the biggest enemy of modern people's health or other important diseases.

As in the above, digital pathology is getting the spotlight as an emerging field of diagnostic medicine. However, the research and development is still in an early stage. The current stage of the research and development can be guessed from the following circumstance. In Korea, there is little research and development on a digital pathology system, and also there is no product associated with the research and development. Even in foreign countries, there is no digital pathology system that is approved for primary diagnosis by the U.S. Food and Drug Administration (FDA).

In such a digital pathology system, image quality may be affected during digital slide image processing steps such as a staining process or an image acquisition process. For example, an image may be slightly blurred and also may have excessively high brightness or low contrast. However, so far, there is no technology for pre-checking and reacquiring a received slide image. Furthermore, there is just a technology for evaluating quality of an individual, small medical image, but there is no technology for evaluating quality of a large image handled by a digital pathology system according to the present invention.

Examining related patent documents, Korean Patent No. 10-1559798, which was registered on Oct. 6, 2015, discloses a method for normalizing an image in digital pathology. In detail, the above patent document discloses the steps of choosing a sample for image normalization, analyzing a spectrum of a certain part of the chosen sample to collect information about a material included in the certain part of the sample, finding a correlation equation through the collected information, correcting the entire image of the sample using the correlation equation, and normalizing the image of the sample through the corrected image.

However, the related patent document discloses nothing about evaluation of image quality by a digital pathology system that processes large images as described above.

SUMMARY

The present invention provides an image quality evaluation method for a digital pathology system which can solve a problem in which image quality may be affected during digital slide image processing steps such as a staining process or an image acquisition process, for example, problems in which an image may be blurred or have high brightness or low contrast and also which can evaluate quality of a large image handled by a digital pathology system proposed in the present invention.

According to an aspect of the present disclosure, there is provided an image quality evaluation method for a digital pathology system. The image quality evaluation method includes receiving a digital slide image by an image quality evaluation unit; dividing the digital slide image into a plurality of blocks by the image quality evaluation unit; analyzing the plurality of blocks to extract a foreground; calculating a blur for the extracted foreground; calculating brightness distortion for the extracted foreground; calculating contrast distortion for the extracted foreground; and evaluating the overall quality of the digital slide image using the blur, the brightness distortion, and the contrast distortion by the image quality evaluation unit.

The calculating of a blur may include finding a set E including all edge pixels of the foreground using a sobel filter; and calculating the blur using Equation 1 below:

$$\text{Blur} = \frac{\sum_{I(x,y) \in E} \sqrt{\sum_{I(x',y') \in N_{xy}} \{I(x,y) - I(x',y')\}^2 / N_{xy}}}{\sum_{I(x,y) \in E} I(x,y)}, \quad [\text{Equation 1}]$$

where $N_{xy}$ is a set of 8 pixels adjacent to a pixel $I(x, y)$, $I(x, y) \in E$, and an absolute value of $N_{xy}$ is the total number of pixels in the set $N_{xy}$.

The calculating of brightness distortion may include determining that a pixel of the foreground has a brightness of 0 when the pixel is absolute black and determining that the pixel has a brightness of 1 when the pixel is absolute white; and calculating the brightness distortion by averaging brightness values of all pixels of the foreground.

The calculating of contrast distortion may include: converting the foreground into gray; calculating a cumulative histogram; and calculating the contrast distortion using Equation 2 below:

Contrast distortion=(histogram binary corresponding to 75% of the maximum value of the cumulative histogram−histogram binary corresponding to 25% of the maximum value)/(maximum in range of pixel value−minimum in range of pixel value). [Equation 2]

The overall quality (WSIQ) of the digital slide image may be defined as Equation 3 blow:

$$WSIQ = 1 - (ax + by + cz),\qquad \text{[Equation 3]}$$

where a+b+c=1, x indicates a blur, y indicates brightness distortion, and z indicates contrast distortion.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
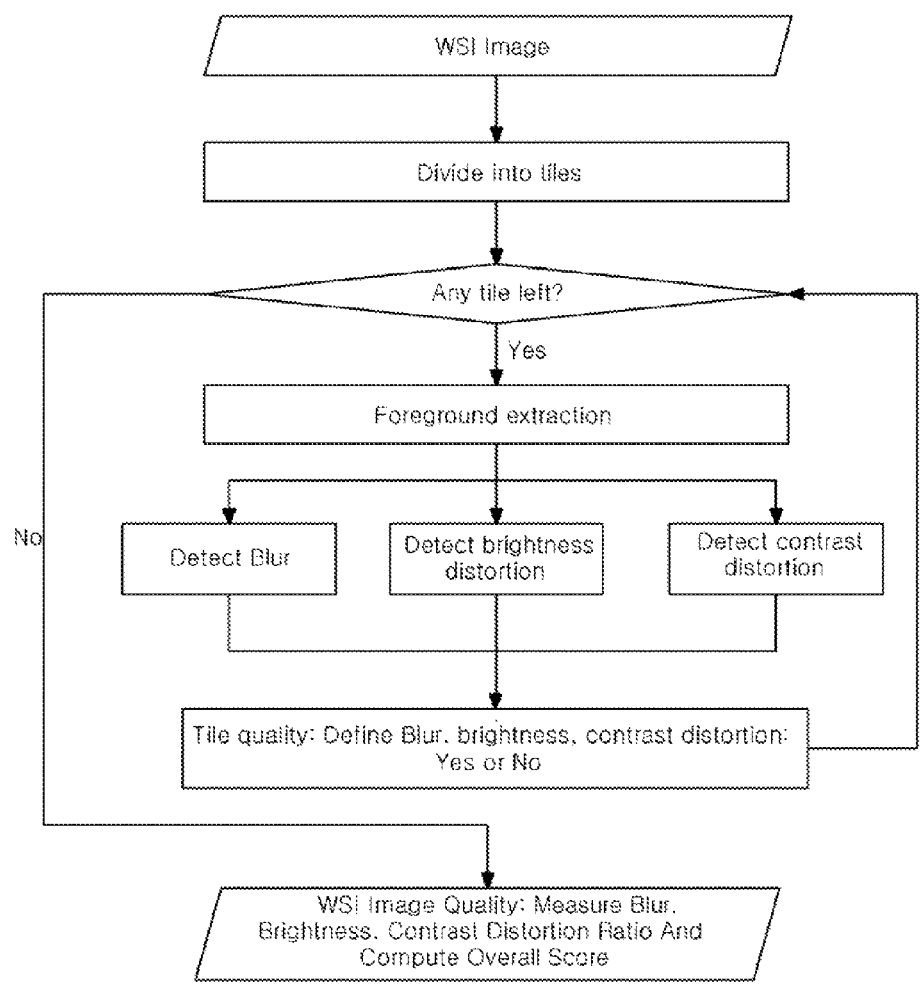
FIG. 1 is a flowchart for describing steps of an image quality evaluation method for a digital pathology system according to the present invention.

Hereinafter, preferred embodiments of the present invention will be described below in more detail with reference to the accompanying drawings. Terms and words used in the specification and the claims shall not be interpreted as commonly-used dictionary meanings, but shall be interpreted as to be relevant to the technical scope of the invention based on the fact that the inventor may properly define the concept of the terms to explain the invention in best ways.

Therefore, the embodiments and the configurations depicted in the drawings are for illustrative purposes only and are not intended to represent all technical scope of the embodiments, so it should be understood that various equivalents and modifications may exist at the time of filing this application.

FIG. 1 is a flowchart for describing steps of an image quality evaluation method for a digital pathology system according to the present invention.

As shown in FIG. 1, an image quality evaluation method for a digital pathology system according to the present invention includes receiving a digital slide image by an image quality evaluation unit; dividing the digital slide image into a plurality of blocks by the image quality evaluation unit; analyzing the plurality of blocks to extract a foreground; calculating a blur for the extracted foreground; calculating brightness distortion for the extracted foreground; calculating contrast distortion for the extracted foreground; and evaluating the overall quality of the digital slide image using the blur, the brightness distortion, and the contrast distortion by the image quality evaluation unit.

First, in the step of receiving a digital slide image from a scanner, as described above, a digital slide image having quality lower than or equal to a threshold may not be received according to the following image quality evaluation method, and furthermore an automatic image reacquisition process may be performed.

Next, the digital slide image is divided into a plurality of blocks or tiles. A foreground is extracted from all of the divided blocks.

Then, a blur for the extracted foreground is calculated. Here, in order to calculate the blur, the foreground is converted into a grey image, and a set E including all edge pixels in the foreground is found by using a sobel filter. The blur is calculated using Equation 1 below:

$$\text{Blur} = \frac{\sum_{I(x,y)\in E} \sqrt{\left|\sum_{I(x',y')\in N_{xy}} \{I(x,y) - I(x',y')\}^2 / N_{xy}\right|}}{\sum_{I(x,y)\in E} I(x,y)}, \qquad \text{[Equation 1]}$$

where $N_{xy}$ is a set of 8 pixels adjacent to a pixel $I(x, y)$, $I(x, y) \in E$, and an absolute value of $N_{xy}$ is the total number of pixels in the set $N_{xy}$.

Here, an image having good quality image denotes that the image has higher sharpness and lower blur. A shaper image has a greater change in intensity near the edge, and a more blurred image has a less change in intensity near the edge. Accordingly, the following equation for the overall quality (WSIQ) of a final digital slide image to be described later is set inversely proportional to the blur.

In addition, brightness distortion is calculated. For the brightness distortion, a pixel in the foreground is determined as having a brightness of 0 when the pixel is absolute black and is determined as having a brightness of 1 when the pixel is absolute white. The brightness distortion is calculated by averaging brightness values of all pixels in the foreground. A boundary value is set in consideration of a limit for a case in which the average brightness can be maximally biased. When the average brightness exceeds the boundary value, the excess is recognized as distortion. In this case, the boundary value is calculated as a statistical value in a real environment.

Here, like the blur, as the brightness distortion decreases, the image quality increases. Accordingly, the following equation for the overall quality (WSIQ) of the final digital slide image to be described later is set such that the overall quality is set inversely proportional to the brightness distortion.

In addition, contrast distortion for the extracted foreground is calculated. In order to calculate the contrast distortion, the foreground is converted into gray, and a cumulative histogram is calculated. The contrast distortion is calculated using Equation 2 below:

Contrast distortion=(histogram binary corresponding to 75% of the maximum value of the cumulative histogram−histogram binary corresponding to 25% of the maximum value)/(maximum in range of pixel value−minimum in range of pixel value). [Equation 2]

Here, like the blur and the brightness distortion, as the contrast distortion decreases, the image quality increases. Accordingly, the following equation for the overall quality (WSIQ) of the final digital slide image is set such that the overall quality is inversely proportional to the contrast distortion.

The above-described blur, brightness distortion, and contrast distortion need not be calculated in the order of description. That is, the calculations may be performed in parallel or in changed order.

Last, the overall quality of the digital slide image is defined as Equation 3 blow:

$$WSIQ = 1 - (ax + by + cz),\qquad \text{[Equation 3]}$$

where a+b+c=1, x is a value indicating a blur, y is a value indicating brightness distortion, and z is a value indicating contrast distortion.

Here, a, b, and c are constrained by a+b+c=1 for normalization.

Figure 2:
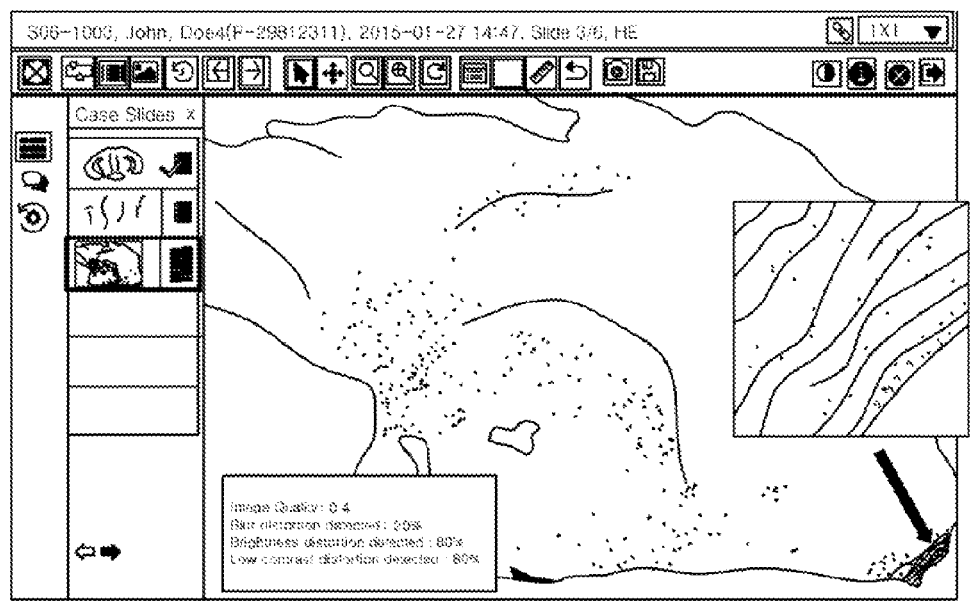
FIG. 2 shows an application example of an image quality evaluation method for a digital pathology system according to the present invention.

FIG. 2 shows an application example of an image quality evaluation method for a digital pathology system according to the present invention. As shown in FIG. 2, blur distortion, i.e., x=0.2, brightness distortion, i.e., y=0.8, and contrast distortion, i.e., z=0.8. In this case, a=⅔, and b=c=⅙. Accordingly, the overall quality index of the final digital slide image, i.e., WSIQ=4.

First, the image quality evaluation method for the digital pathology system according to the present invention can avoid acquiring an unusable image with low quality or furthermore automatically perform reacquisition by acquiring an image after evaluating quality of the image in order to solve a problem in which image quality may be affected during digital slide image processing steps such as a staining process or an image acquisition process in the digital pathology system, for example, a problem in which an image may be blurred or have high brightness or low contrast.

Second, while there has been a conventional method for evaluating quality of a normal image, a new image quality evaluation method for evaluating a large image handled by the digital pathology system according to the present invention has been proposed.

Third, the image quality evaluation method for the digital pathology system according to the present invention can evaluate quality in consideration of all of blur, contrast, and brightness and also quickly perform the evaluation. Accordingly, the image quality evaluation method is suitable for evaluating quality of a large image such as a digital slide image (whole slide image; WSI).

While the present invention has been described with reference to a few specific embodiments, the description is illustrative of the invention and is not to be construed as limiting the invention. Various modifications may occur to those skilled in the art without departing from the spirit and scope of the invention as defined by the appended claims and their equivalents.

What is claimed is:

1. An image quality evaluation method for a digital pathology system, the image quality evaluation method comprising:

receiving a digital slide image by an image quality evaluation unit;

dividing the digital slide image into a plurality of blocks by the image quality evaluation unit;

analyzing the plurality of blocks to extract a foreground;

calculating a blur for the extracted foreground;

calculating brightness distortion for the extracted foreground;

calculating contrast distortion for the extracted foreground;

evaluating the overall quality of the digital slide image using the blur, the brightness distortion, and the contrast distortion by the image quality evaluation unit.

2. The image quality evaluation method of claim 1, wherein the calculating of a blur comprises finding a set E including all edge pixels of the foreground using a sobel filter; and calculating the blur using Equation 1 below:

$$\text{Blur} = \frac{\sum_{I(x,y) \in E} \sqrt{\sum_{I(x',y') \in N_{xy}} \{I(x, y) - I(x', y')\}^2 / N_{xy}}}{\sum_{I(x,y) \in E} I(x, y)},\quad [\text{Equation 1}]$$

where $N_{xy}$ is a set of 8 pixels adjacent to a pixel $I(x, y)$, $I(x, y) \in E$, and an absolute value of $N_{xy}$ is the total number of pixels in the set $N_{xy}$.

3. The image quality evaluation method of claim 2, wherein the calculating of brightness distortion comprises: determining that a pixel of the foreground has a brightness of 0 when the pixel is absolute black and determining that the pixel has a brightness of 1 when the pixel is absolute white; and calculating the brightness distortion by averaging brightness values of all pixels of the foreground.

4. The image quality evaluation method of claim 3, wherein the calculating of contrast distortion comprises: converting the foreground into gray; calculating a cumulative histogram; and calculating the contrast distortion using Equation 2 below:

Contrast distortion=(histogram binary corresponding to 75% of the maximum value of the cumulative histogram−histogram binary corresponding to 25% of the maximum value)/(maximum in range of pixel value−minimum in range of pixel value)  [Equation 2].

5. The image quality evaluation method of claim 4, wherein the overall quality (WSIQ) of the digital slide image is defined using Equation 3 below:

WSIQ=1−(ax+by+cz),  [Equation 3]

where a+b+c=1, x indicates a blur, y indicates brightness distortion, and z indicates contrast distortion.

* * * * *